UNITED STATES PATENT OFFICE.

FRANCIS E. HUFNAIL, OF MINNEAPOLIS, MINNESOTA.

PROCESS OF MAKING A MEDICINAL COMPOSITION.

1,082,081. Specification of Letters Patent. Patented Dec. 23, 1913.

No Drawing. Application filed November 19, 1910. Serial No. 593,164.

*To all whom it may concern:*

Be it known that I, FRANCIS E. HUFNAIL, a citizen of the United States, residing at Minneapolis, in the county of Hennepin and State of Minnesota, have invented a new and useful Process of Making a Medicinal Composition, of which the following is a specification.

My composition of matter consists of the following ingredients incorporated and combined in the manner hereinafter stated and entering into the compound, as finally prepared and completed, in substantially the proportions stated: Concentrated aqueous solution of caffein three ounces, concentrated aqua ammonia, (saturated solution containing thirty per cent. of ammonia gas and chemically pure), three ounces, aqua regia (20 drops of hydrochloric acid and 10 drops of nitric acid, both chemically pure and properly mixed to form aqua regia four or five hours before using) thirty drops. Normal aqueous solution of urea (according to approximately a one-and-one-half per cent. to two per cent. solution of urea) six ounces, all proportions by volume.

It will be seen that my remedial compound is not such a compound of medicinal agents as could be made by the mere exercise of the skill of the physician. It is a discovery, the result of laborious and comprehensive study and experiment, the efficacy of which has been proved by me in a number of successful trials; the nature of the combination and the ingredients entering therein, and the mode of preparing and compounding the same, being in no-wise suggested by any known publications or systems of instruction in *materia medica* or therapeutics.

In the preparation of my compound, I have found the method herein described to give the best results and to produce the said compound safely in such manner as to insure the presence therein to a high degree of the curative principles which render my compound efficacious in the treatment of the class of diseases for which it is intended, but I do not wish to be limited to the precise order of steps enumerated or to the exact proportions of ingredients used, as changes therein may prove advantageous under certain conditions and fall within the scope of my invention.

The first step in my process is the preparation of an aqueous solution of caffein, and this I do by adding to freshly ground roasted coffee, of good commercial grade, water in the proportion of two quarts of water to each pound of coffee used, then boiling and simmering same until the mixture is reduced to a consistency of heavy liquid lye, preferred specific gravity between 1.058 and 1.059, after which I strain hot, cool and filter, and boil again until the liquid is reduced or concentrated to eight ounces for each pound of coffee used. Other means of obtaining this concentrated aqueous solution of caffein may be employed, such, for example, as forming the solution directly from the drug caffein, but it is essential that the ultimate solution shall be an aqueous solution and not an alcoholic extract, as the presence of alcohol would materially interfere with the results sought. The method used by me is simple and has proved, from experiment, most satisfactory.

The second step of my process consists in adding to the caffein solution an equal amount of chemically pure aqua ammonia, heating the mixture slowly until it comes to boiling, then keeping the same boiling, stirring constantly, until reduced one half.

The third step in making my compound comprises the preparation of aqua regia by mixing hydrochloric acid and nitric acid in the proportions of two parts by measure of the former to one of the latter, letting the mixture stand in glass stoppered receptacle not less than four, nor more than ten, hours, and adding same to freshly voided normal human urine or an aqueous solution of urea having similar proportions of urea and water, in the proportions of thirty drops of aqua regia to each eight ounces of the urine or solution of urea.

The fourth and final step consists in placing the ammonia-caffein solution over a high flame, adding at once the solution of urea and aqua regia, bringing to a boil as rapidly as possible, stirring constantly, cooling, filtering and bottling in dark colored, glass or rubber-stoppered bottles. The final step will reduce the measured amount of liquid one-fourth.

My new remedial compound, resulting from the above process, when cool is a heavy liquid, with a specific gravity of 1.060+, a dark coffee-amber color, but not turgid, and a slightly stimulating odor, first of aromatic ammonia and then of mild coffee. My compound is a specific remedial agent intended for internal use. The dose will vary from one to sixty minims according to the age and condition of the patient, to be administered three or four times in each twenty-four hours.

I claim—

1. The process of making a medicinal compound for use in the treatment of diabetes and kindred diseases which consists in combining a concentrated aqueous decoction of coffee and chemically pure aqua-ammonia through mixing and concentrating by boiling, adding thereto an aqueous solution of urea previously acidulated with aqua regia, rapidly heating the mixture, cooling, filtering and bottling.

2. The process of making a medicinal compound for use in the treatment of diabetes and kindred diseases which consists in mixing equal volumes of a concentrated aqueous decoction of coffee and thirty per cent. chemically pure ammonia, boiling and agitating said mixture until reduced one-half, adding to the resulting concentrate an equal volume of aqueous solution of urea in which has been previously incorporated aqua regia in the proportion of thirty drops for each eight ounces of the urine used, heating the latter mixture rapidly to boiling, with constant agitation, cooling immediately, filtering, and bottling.

3. The process of making a medicinal compound for use in the treatment of diabetes and kindred diseases which consists in the following steps—first, adding to commercial freshly ground coffee water in the proportion of two quarts thereof to each pound of coffee, slowly boiling the same until it attains the consistency of heavy liquid lye, straining hot, cooling, filtering, and boiling again until reduced and concentrated to the proportion of eight ounces of concentrate to each pound of coffee used; second, adding thereto an equal volume of thirty per cent. chemically pure aqua ammonia, heating and boiling slowly with constant agitation, until reduced one half; third, adding to an aqueous solution of urea comprising approximately one-and-one-half per cent. of urea aqua regia, prepared from chemically pure hydrochloric and nitric acid in proportions of two parts of the former to one part of the latter not less than four, nor more than ten, hours before using, in the proportion of thirty drops of the aqua regia to each eight ounces of the solution of urea; and fourth, uniting equal volumes of the products of the second and third steps, rapidly bringing the mixture to a boil, cooling immediately, filtering and bottling.

In testimony whereof I have signed my name to this specification in the presence of two subscribing witnesses this 16th day of November, 1910.

FRANCIS E. HUFNAIL.

Witnesses:
F. A. WHITELEY,
H. A. BOWMAN.